United States Patent
Hickey et al.

(10) Patent No.: US 9,895,964 B1
(45) Date of Patent: Feb. 20, 2018

(54) TONNEAU COVER HAVING FLEXIBLE HINGE WITH CUT-RESISTANT BARRIER

(71) Applicant: Extang Corporation, Ann Arbor, MI (US)

(72) Inventors: Mark A. Hickey, Howell, MI (US); Jerome J. Facchinello, Grand Blanc, MI (US); Joseph J. Koengeter, Chelsea, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 15/423,846

(22) Filed: Feb. 3, 2017

(51) Int. Cl.
*B60J 7/19* (2006.01)
*B60J 7/04* (2006.01)

(52) U.S. Cl.
CPC .............. *B60J 7/196* (2013.01); *B60J 7/041* (2013.01)

(58) Field of Classification Search
CPC ........... B60J 7/196; B60J 7/085; B60J 10/006
USPC ..................... 296/100.02, 100.06, 100.09
See application file for complete search history.

(56) References Cited

U.S. PATENT DOCUMENTS

| | | | | |
|---|---|---|---|---|
| 3,148,724 | A * | 9/1964 | Chieger | B60J 5/14 160/201 |
| 4,210,361 | A * | 7/1980 | Marvin | B60J 7/068 296/100.03 |
| 4,747,441 | A * | 5/1988 | Apolzer | B60J 7/041 160/206 |
| 4,793,397 | A * | 12/1988 | Whiteman | E05D 15/165 160/201 |
| 5,636,893 | A * | 6/1997 | Wheatley | B60J 7/141 16/354 |
| 5,782,282 | A * | 7/1998 | Chen | E05D 3/12 16/250 |
| 6,276,735 | B1 * | 8/2001 | Champion | B60J 7/041 296/100.06 |
| 8,348,328 | B2 * | 1/2013 | Walser | B60J 7/141 296/100.09 |
| 8,672,388 | B2 * | 3/2014 | Rusher | B60P 7/02 296/100.09 |
| 9,004,571 | B1 * | 4/2015 | Bernardo | B60J 7/141 296/100.03 |
| 9,399,391 | B2 * | 7/2016 | Bernardo | B60J 7/085 |
| 2001/0035664 | A1 * | 11/2001 | Steffens | B60J 7/141 296/100.09 |
| 2008/0136213 | A1 * | 6/2008 | Limbacher | B60J 7/085 296/100.18 |
| 2014/0312645 | A1 * | 10/2014 | Maimin | B60J 7/141 296/100.09 |

(Continued)

FOREIGN PATENT DOCUMENTS

WO    WO 9401298 A1 * 1/1994 ............... B60J 5/14

*Primary Examiner* — H Gutman
(74) *Attorney, Agent, or Firm* — Harness, Dickey & Pierce, P.L.C.

(57) ABSTRACT

A tonneau cover for covering a cargo box of a vehicle. The tonneau cover includes a plurality of flexible hinges, each of which is between two rigid members. Each flexible hinge includes an elastomeric material having a first portion connected to a first one of the rigid members, a second portion connected to a second one of the rigid members, and a web between the first portion and the second portion. A cut-resistant barrier is associated with the flexible web and bridges between the first portion and the second portion. The cut-resistant barrier is effective to resist penetration by a sharp edge.

23 Claims, 3 Drawing Sheets

(56) References Cited

U.S. PATENT DOCUMENTS

| 2016/0031305 A1 | 2/2016 | Bernardo et al. | |
| 2016/0200375 A1* | 7/2016 | Kerr, III | B60J 7/198 296/100.07 |
| 2016/0200376 A1* | 7/2016 | Kerr, III | B60P 7/02 296/100.07 |

* cited by examiner

TONNEAU COVER HAVING FLEXIBLE HINGE WITH CUT-RESISTANT BARRIER

FIELD

The present disclosure relates to a secure hinge, such as a secure hinge for a tonneau cover for example.

BACKGROUND

This section provides background information related to the present disclosure, which is not necessarily prior art.

Vehicles, such as pickup trucks, having an open top cargo box are popular because the cargo box enables objects of various sizes to be placed therein and transported. Tonneau cover systems can be used to cover the top of cargo box when in a deployed or closed arrangement to protect the contents against the environment and theft, for example. An exemplary tonneau cover is formed of a plurality of rigid members connected by flexible hinges so that the tonneau cover can be rolled-up into a retracted arrangement within a storage housing typically positioned adjacent a forward end of the cargo box. In a deployed arrangement, the tonneau cover can be extended out from within the storage housing to cover the cargo box.

While current tonneau covers are suitable for their intended use, they are subject to improvement. For example, a tonneau cover that is better able to resist being cut open by a sharp edge inserted through one or more of the flexible hinges would be desirable. The present teachings advantageously provide for a tonneau cover with flexible hinges that are better able to resist penetration by a sharp edge as compared to current tonneau covers. One skilled in the art will appreciate that the present teachings provide numerous additional advantages as well.

SUMMARY

This section provides a general summary of the disclosure, and is not a comprehensive disclosure of its full scope or all of its features.

The present teachings provide for a tonneau cover for covering a cargo box of a vehicle. The tonneau cover includes a plurality of flexible hinges, each of which is between two rigid members. Each flexible hinge includes an elastomeric material having a first portion connected to a first one of the rigid members, a second portion connected to a second one of the rigid members, and a flexible web between the first portion and the second portion. A cut-resistant barrier is associated with the flexible web and bridges between the first portion and the second portion. The cut-resistant barrier is effective to resist penetration by a sharp edge.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
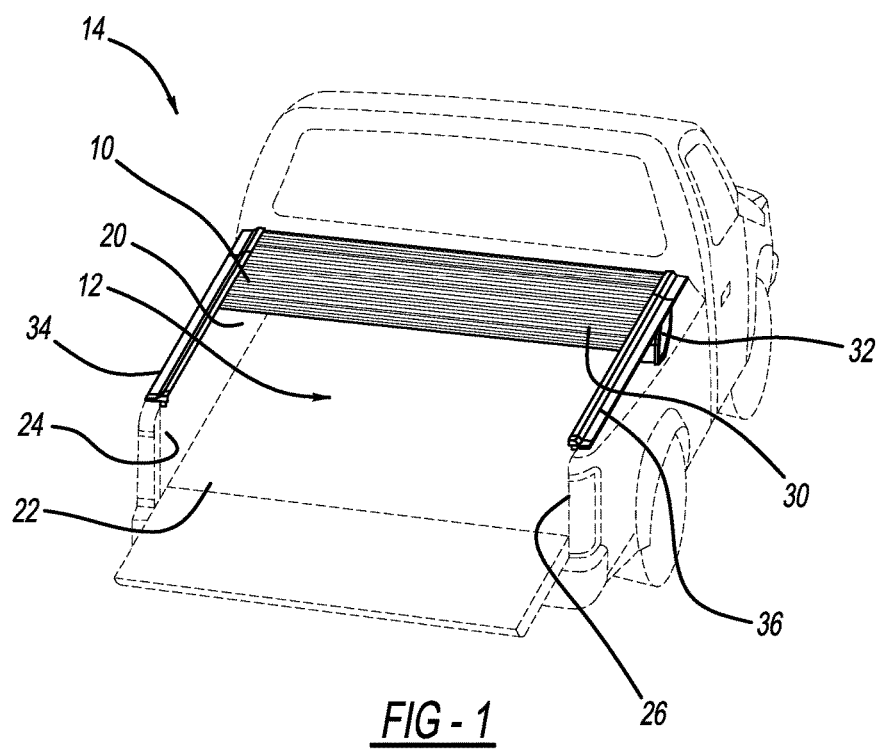
FIG. 1 is a perspective view of a tonneau cover in accordance with the present teachings installed over a cargo bed of an exemplary vehicle.

FIG. 1 illustrates a tonneau cover 10 according to the present teachings installed over a cargo box 12 of an exemplary vehicle 14. Although the vehicle 14 is illustrated as a pickup truck, the tonneau cover 10 can be used with any other suitable vehicle to cover a cargo box thereof. The exemplary cargo box 12 of FIG. 1 includes a forward end 20 and a rear end 22, which is opposite to the forward end 20. Extending between the forward end 20 and the rear end 22 is a first sidewall 24 and a second sidewall 26. The first and second sidewalls 24 and 26 are spaced apart on opposite sides of the cargo box 12.

Figure 2:
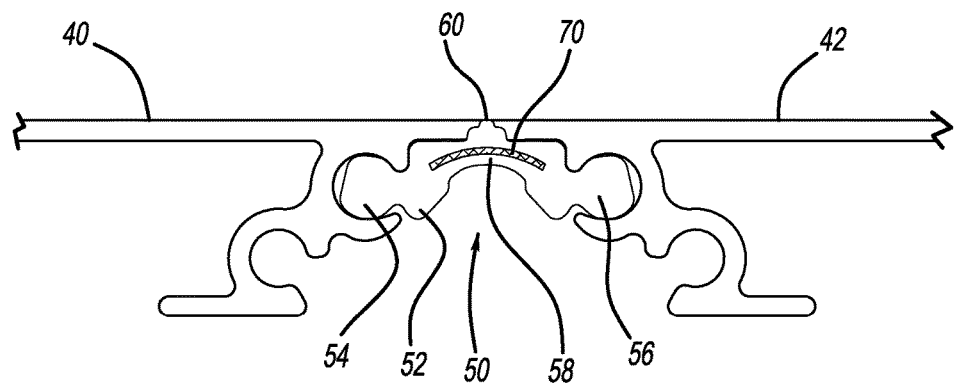
FIG. 2 is a cross-sectional view of a flexible hinge connecting two rigid members of the tonneau cover of FIG. 1.

The tonneau cover 10 includes a plurality of rigid members or slats 30. The plurality of rigid members 30 can be made of any suitable material, such as a metallic material. The slats 30 can form an outer surface of the cover 10 when deployed, or can be covered by a flexible sheet. The plurality of rigid members 30 are connected by flexible hinges. Specifically, neighboring rigid members 30 are connected together with a flexible hinge therebetween. For example and as explained further herein, FIG. 2 illustrates a pair of neighboring rigid members as a first rigid member 40 and a second rigid member 42, which are connected by flexible hinge 50. The tonneau cover 10 includes a plurality of flexible hinges 50, which are arranged between most, if not all, of the plurality of rigid members 30 to connect the plurality of rigid members 30 together.

The plurality of rigid members 30 are movable between a retracted arrangement and a deployed arrangement. In the retracted arrangement, the rigid members 30 are housed within storage housing 32, which is arranged at or proximate to the forward end 20 of the cargo box 12. The plurality of rigid members 30 can be stored within the storage housing 32 in any suitable manner, such as in a rolled-up arrangement. To move the plurality of rigid members 30 to the deployed arrangement, the rigid members 30 are pulled out from within the storage housing 32 towards the rear end 22. Opposite sides of the rigid members 30 are supported over the cargo box 12 by a first side rail 34 and a second side rail 36. The first side rail 34 is arranged at the first sidewall 24, and the second side rail 36 is arranged at the second sidewall 26. The plurality of rigid members 30 and the flexible hinges 50 extend across a width of the cargo box 12 from the first side rail 34 to the second side rail 36. FIG. 1 illustrates the plurality of rigid members 30 in a partially deployed arrangement in which the rigid members 30 cover only a portion of the cargo box 12.

As illustrated in FIG. 2, neighboring first rigid member 40 and second rigid member 42, which are exemplary rigid members 30, do not overlap, are slightly spaced apart to define a gap therebetween, and are connected by the flexible hinge 50. Arranged in the gap between the first and second rigid members 40 and 42 is a flange 60 of the flexible hinge 50. FIG. 2 illustrates the first and second rigid members 40 and 42 extending parallel to one another in the same plane, and is a representative deployed arrangement for neighboring rigid members 30.

The flexible hinge 50 includes an elastomeric material 52 having a first portion 54 and a second portion 56, which is opposite to the first portion 54. The first portion 54 is at a first side of the elastomeric material 52, and the second portion 56 is at a second side of the elastomeric material 52, which is opposite to the first side. The first portion 54 is coupled to or integral with the first rigid member 40, and the second portion 56 is coupled to or integral with the second rigid member 42 in any suitable manner.

Between the first and second portions 54 and 56, the elastomeric material 52 includes a flexible web 58. The flexible web 58 flexes to accommodate movement of the first and second rigid members 40 and 42 relative to one another, such as when the tonneau cover 10 is being moved between the deployed arrangement and the retracted arrangement. With respect to the retracted arrangement, the flexible web 58 flexes to allow the first and second portions 54 and 56 of elastomeric material 52 to fold inward towards each other to allow the first and second rigid members 40 and 42 to fold towards one another as the plurality of rigid members 30 are rolled up into the storage housing 32.

The flexible hinge 50 further includes a cut-resistant barrier 70, which is effective to resist penetration by a sharp edge, such as a knife edge used by an intruder in an attempt to cut through the flexible hinge 50 to access the cargo box 12 when the plurality of rigid members 30 are in the deployed arrangement. The cut-resistant barrier 70 generally bridges between the first portion 54 and the second portion 56 of the elastomeric material 52. The cut-resistant barrier 70 can extend continuously along the flexible hinge 50 across a width of the cargo box 12, such as between the first and second side rails 34 and 36. Alternately, the barrier 70 can extend partway across the cargo box 70 to provide protection in the regions adjacent the first and second sidewalls 24 and 26, which are most likely to be cut by an intruder attempting to access the cargo box 12. By way of another alternative, barriers 70 can be segments that are spaced apart along the flexible hinge 50 to reduce the effect of the barriers 70 on the flexibility of the hinge 50.

In general, it is believed that materials that form effective cut-resistant barriers tend to have a higher hardness than the elastomeric material 52. Thus, the elastomeric material 52 can have a first hardness, and the cut-resistant barrier 70 can have a second hardness that is greater than the first hardness. The elastomeric material 52 and the cut-resistant barrier 70 can be made of any suitable polymeric materials. For example, the elastomeric material 52 can be made of a first polymeric material, and the cut-resistant barrier 70 can be made of a second polymeric material that is distinct from, and harder than, the first polymeric material. The flexible hinge 50 can be a coextrusion including the elastomeric material 52 and the cut-resistant barrier 70. The cut resistant barrier 70 can also be formed of any suitable metal, such as any suitable metal having a hardness greater than the hardness of the elastomeric material 52. For example, the cut-resistant barrier 70 can include steel, such as a flexible steel band or a flexible steel spring.

Figure 3:
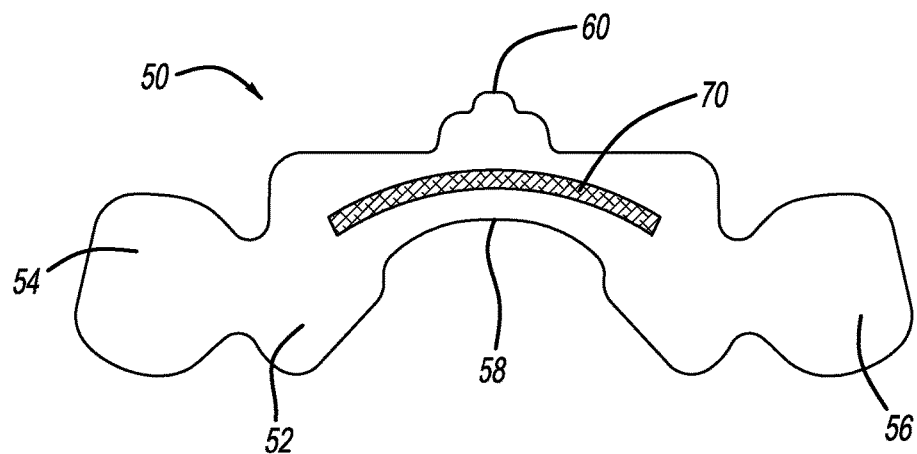
FIG. 3 is a cross-sectional view of the flexible hinge of FIG. 2.
Figure 4:
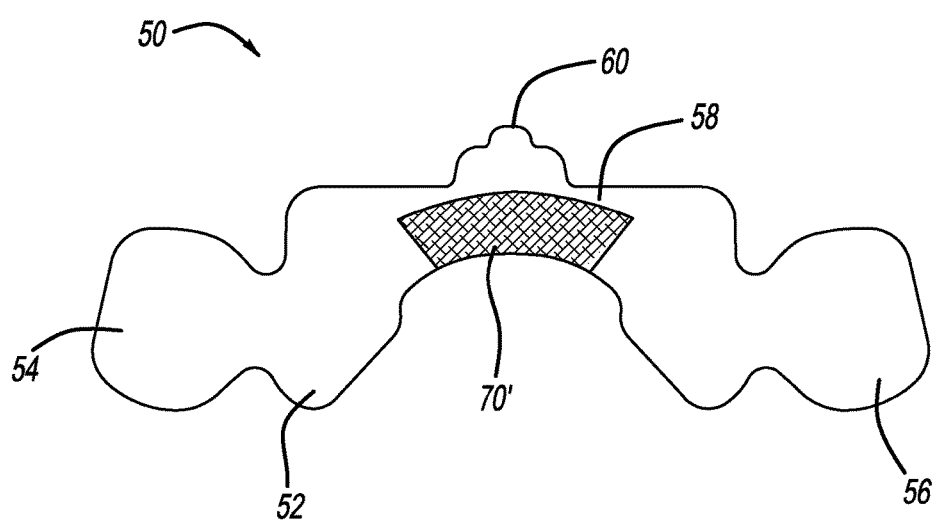
FIG. 4 is a cross-sectional view of another tonneau cover flexible hinge according to the present teachings.

The cut-resistant barrier 70 can be fully embedded within the flexible web 58, as illustrated in FIGS. 2 and 3. Alternatively, the cut-resistant barrier 70 can be only partially embedded in the flexible web 58, as illustrated in the example of FIG. 4 at reference numeral 70'. The partially embedded cut-resistant barrier 70' is exposed on a side of the flexible web 58 opposite to the flange 60.

Figure 5:
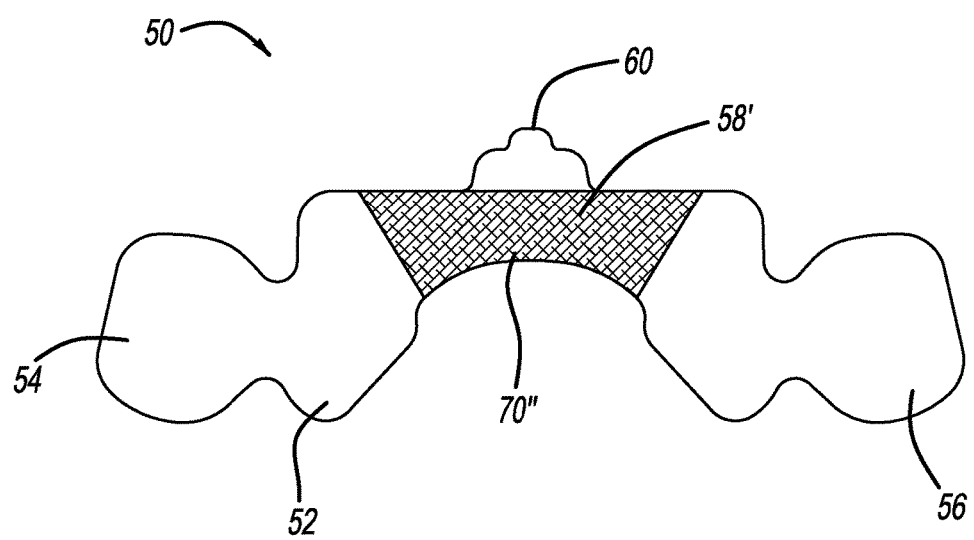
FIG. 5 is a cross-sectional view of yet another tonneau cover flexible hinge according to the present teachings.

With reference to FIG. 5, the flexible hinge 50 can be configured such that cut resistant barrier 70" is the web 58' between the first and second portions 54 and 56. Thus, the elastomeric material 52 providing the first and second portions 54 and 56 can have the first hardness and the cut-resistant barrier 70" (web 58') can have the second hardness that is greater than the first hardness. In the arrangement of FIG. 5, the web 58' can have a flexibility less than first and second portions 54 and 56, with the first and second portions 54 and 56 providing the necessary flexibility for hinge 50. In one example, cut-resistant barrier 70" is formed of a polymeric material, and hinge 50 is integrally formed by co-extruding the cut-resistant barrier 70", the first and second portions 54 and 56, and the flange 60.

The flexible hinge 50 provides numerous advantages. For example, the flexible hinge 50 was subject to a stab test in which a knife was stabbed through: (A) three flexible hinges 50 including the cut-resistant barrier 70 made of a polymeric material, wherein the polymeric barrier was partially embedded as shown in FIG. 4; (B) three flexible hinges 50 including the cut-resistant barrier 70 made of a metallic material, wherein the metallic barrier was fully embedded as shown in FIG. 3; and (C) three flexible hinges that do not include the cut-resistant barrier 70. The force required to stab the knife through the different flexible hinges was measured with a force gauge.

The average force required to stab through the three flexible hinges 50 including the polymeric cut-resistant barrier 70 was 15.4 pounds. The average force required to stab through the three flexible hinges 50 including the metallic cut-resistant barrier 70 was 16 pounds. The average force required to stab through the three flexible hinges not including the cut-resistant barrier 70 was only 8.2 pounds. Thus, more force was required to stab through the flexible hinges 50 including the cut-resistant barriers 70 than was required to stab through the flexible hinges not including the cut-resistant barriers. In general, it is believed that a hinge requiring a force of at least 12 pounds is advantageously more secure and resistant to tampering. A hinge requiring at least 15 pounds of cutting force is preferred.

The flexible hinge 50 was also subject to a push test in which after the knife was stabbed through the flexible hinge 50, the force required to push the knife along the flexible hinge 50 in a direction generally perpendicular to the stabbing direction was measured for: (A) three flexible hinges 50 including the cut-resistant barrier 70 made of a polymeric material; (B) three flexible hinges 50 including the cut-resistant barrier 70 made of a metallic material; and (C) three flexible hinges that do not include the cut-resistant barrier 70.

The average force required to push the knife along the flexible hinge 50 including the polymeric cut-resistant barrier 70 was 19.6 lbs. The average force required to push the knife along the flexible hinge 50 including the metallic cut-resistant barrier 70 was 58.5 lbs. The average force required to push the knife along the flexible hinge not including the cut-resistant barrier 70 was only 10.8 lbs. Thus, more force was required to push the knife along the flexible hinges 50 including the cut-resistant barriers 70 than was required to push the knife along the flexible hinges not including the cut-resistant barriers. This further shows that tonneau covers 10 including the flexible hinges 50 having the cut-resistant barriers 70 are advantageously more secure and resistant to tampering.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover for covering a cargo box of a vehicle, the cargo box having a forward end and a rear end, and first and second sidewalls therebetween, the tonneau cover comprising:
    a plurality of rigid members; and
    a plurality of flexible hinges, each flexible hinge of the plurality of flexible hinges flexibly connecting two of the plurality of rigid members together to allow movement of the rigid members between a deployed arrangement wherein the plurality of rigid members are generally planar for covering the cargo box, and a retracted arrangement wherein the cover is rolled or folded to allow access to the cargo box;
    each flexible hinge of the plurality of flexible hinges including:
        a first portion connected to a first one of the rigid members,
        a second portion connected to a second one of the rigid members, and
        a web interconnecting the first portion and the second portion,
        at least said first and second portions being formed of an elastomeric material;
        said flexible hinge further comprising a cut-resistant barrier associated with the web and bridging between the first portion and the second portion, the cut-resistant barrier effective to resist penetration by a sharp edge stabbed into the cut-resistant barrier at up to 16 lbs. of stab force, and resist the sharp edge from being pushed along a length of the cut-resistant barrier at up to 58.5 lbs. of push force.

2. The tonneau cover of claim 1, wherein the plurality of rigid members and the plurality of flexible hinges extend across a width of the cargo box from the first sidewall to the second sidewall.

3. The tonneau cover of claim 1, wherein:
    the elastomeric material is a first polymeric material; and
    the cut-resistant barrier is composed of a second polymeric material distinct from the first polymeric material.

4. The tonneau cover of claim 3, wherein the flexible hinge is a coextrusion including the elastomeric material and the cut-resistant barrier.

5. The tonneau cover of claim 1, wherein the web is a flexible web formed of an elastomeric material, and the cut-resistant barrier is formed of a metal.

6. The tonneau cover of claim 5, wherein the cut-resistant barrier includes a flexible steel band.

7. The tonneau cover of claim 1, wherein the web is a flexible web formed of an elastomeric material, and the cut-resistant barrier is formed of a polymeric material distinct from the elastomeric material and embedded in the flexible web.

8. The tonneau cover of claim 1, wherein the plurality of rigid members include a plurality of slats.

9. The tonneau cover of claim 1, wherein the first portion of the elastomeric material is a first side of the elastomeric material, the second portion of the elastomeric material is a second side of the elastomeric material, and the first side is opposite to the second side.

10. The tonneau cover of claim 1, wherein in the extended position each one of the plurality of rigid members is supported by a first side rail mounted to the first sidewall and a second side rail mounted to the second sidewall.

11. The tonneau cover of claim 1, wherein adjacent ones of the rigid members do not overlap.

12. The tonneau cover of claim 1, wherein the cut-resistant barrier is partially embedded in the web.

13. The tonneau cover of claim 1, wherein the cut-resistant barrier is fully embedded in the web.

14. The tonneau cover of claim 1, wherein the web is formed of the cut-resistant barrier.

15. A tonneau cover for covering a cargo box of a vehicle, the cargo box having a forward end and a rear end, and first and second sidewalls therebetween, the tonneau cover comprising:
a plurality slats; and
a plurality of flexible hinges, each flexible hinge of the plurality of flexible hinges flexibly connecting two of the plurality of slats together to allow movement of the slats between a deployed arrangement wherein the plurality of slats are generally planar for covering the cargo box, and a retracted arrangement wherein the cover is rolled or folded to allow access to the cargo box;
each flexible hinge of the plurality of flexible hinges including:
a first side connected to a first one of the slats,
a second side opposite to the first side and connected to a second one of the slats; and
a web between the first side and the second side,
at least said first side and said second side being formed of an elastomeric material having a first hardness,
the web comprising a cut-resistant barrier bridging between the first side and the second side, the cut-resistant barrier having a second hardness that is greater than the first hardness and effective to resist penetration by a sharp edge stabbed into the cut-resistant barrier at up to 16 lbs. of stab force, and resist the sharp edge from being pushed along a length of the cut-resistant barrier at up to 58.5 lbs. of push force.

16. The tonneau cover of claim 15, wherein:
the elastomeric material is a first polymeric material; and
the cut-resistant barrier is composed of a second polymeric material distinct from the first polymeric material.

17. The tonneau cover of claim 16, wherein each one of the plurality of flexible hinges is a coextrusion including the elastomeric material and the cut-resistant barrier.

18. The tonneau cover of claim 15, wherein the web is a flexible web formed of an elastomeric material and the cut-resistant barrier is formed of a metal.

19. The tonneau cover of claim 18, wherein the cut resistant barrier includes a flexible steel band or a flexible steel spring.

20. The tonneau cover of claim 15, wherein the cut-resistant barrier is partially embedded in the web.

21. The tonneau cover of claim 15, wherein the cut resistant-barrier is completely embedded in the web.

22. The tonneau cover of claim 15, wherein the web is a flexible web formed of an elastomeric material and the cut-resistant barrier is formed of a polymeric material distinct from the elastomeric material.

23. The tonneau cover of claim 15, wherein the web is formed of the cut-resistant barrier.

* * * * *